United States Patent
Shi

(10) Patent No.: US 11,196,530 B2
(45) Date of Patent: Dec. 7, 2021

(54) METHOD FOR SWITCHING STATUS OF SECONDARY CARRIER, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/898,316

(22) Filed: Jun. 10, 2020

(65) Prior Publication Data
US 2020/0304277 A1 Sep. 24, 2020

Related U.S. Application Data

(63) Continuation of application No. PCT/CN2018/080065, filed on Mar. 22, 2018.

(51) Int. Cl.
*H04L 5/00* (2006.01)
*H04W 72/04* (2009.01)
*H04W 80/02* (2009.01)

(52) U.S. Cl.
CPC ....... *H04L 5/0098* (2013.01); *H04W 72/0453* (2013.01); *H04W 80/02* (2013.01); *H04L 5/0005* (2013.01)

(58) Field of Classification Search
CPC .............. H04L 5/0005; H04L 5/0098; H04W 72/0453; H04W 80/02
See application file for complete search history.

(56) References Cited

U.S. PATENT DOCUMENTS

| 2015/0304915 | A1 | 10/2015 | Uchino et al. |
| 2019/0021052 | A1* | 1/2019 | Kadiri ............... H04W 52/0206 |
| 2019/0166631 | A1* | 5/2019 | Park ...................... H04L 5/0098 |
| 2019/0190682 | A1* | 6/2019 | Kadiri .................. H04L 5/0053 |
| 2019/0208429 | A1* | 7/2019 | Hong .................... H04W 16/32 |
| 2020/0412513 | A1* | 12/2020 | Bergstrom ............ H04L 5/0098 |

FOREIGN PATENT DOCUMENTS

| CN | 102668669 A | 9/2012 |
| CN | 102724715 A | 10/2012 |
| CN | 103338484 A | 10/2013 |

(Continued)

OTHER PUBLICATIONS

3GPP TSG-RAN WG2 Meeting #101—Athens, Greece, Feb. 26-Mar. 2, 2018—CMCC, Report from Break-Out Session (19 pages).

(Continued)

*Primary Examiner* — Kent Krueger
(74) *Attorney, Agent, or Firm* — Perkins Coie LLP

(57) ABSTRACT

Implementations of the present disclosure disclose a method for switching a status of a secondary carrier, a terminal device, and a network device. The method comprises: a terminal device receiving a media access control (MAC) control element (CE) sent by a network device; and the terminal device switching a first secondary carrier of the terminal device from a first state to a second state according to the MAC CE, wherein the first state and the second state are two different states of an activated state, a deactivated state, and a dormant state.

16 Claims, 7 Drawing Sheets

(56) References Cited

FOREIGN PATENT DOCUMENTS

| CN | 104871636 A | 8/2015 |
|---|---|---|
| CN | 105637967 A | 6/2016 |
| CN | 108702652 A | 10/2018 |
| RU | 2622286 C2 | 6/2017 |
| WO | 2017213223 A1 | 12/2017 |

OTHER PUBLICATIONS

Huawei, HiSilicon, ""Discussion on New SCell State"," R2-1802655, 3GPP TSG-RAN WG2 Meeting #101, Feb. 14, 2018 (Feb. 14, 2018), pp. 1-3.
Nokia, Nokia Shanghai Bell, ""Remaining Details of New SCell State"," R2-1802755, 3GPP TSG-RAN WG2 #101, Feb. 16, 2018 (Feb. 16, 2018), 4 pages.
Qualcomm Inc., ""SCell New State Transitions and Signalling Procedures"," R2-1802074, 3GPP TSG-RAN2 Meeting #101, Feb. 15, 2018 (Feb. 15, 2018), pp. 1-3.
Technical Specification Group Radio Access Network; 'NR; Medium Access Control (MAC) protocol Specification (Release 15) 3GPP TS 38.321 V15.0.0, 3rd Generation Partnership Project; Jan. 4, 2018 (Jan. 4, 2018), 55 pages.
TSG RAN WG2. "Status Report to TSG" RP-180044, 3GPP TSG RAN meeting #79, Mar. 12, 2018 (Mar. 12, 2018), 7 pages.
Vivo, ""MAC CE for the New SCell State"," R2-1802002, 3GPP TSG-RAN WG2 Meeting #101, Feb. 14, 2018 (Feb. 14, 2018), pp. 1-3.
International Search Report dated Dec. 12, 2018 of PCT/CN2018/080065 (4 pages).
3GPP TSG-RAN WG2 #100—Reno, USA, Nov. 27-Dec. 1, 2017—R2-1714288—Running MAC CR for euCA, Nokia, Nokia Shanghai Bell R2 (7 pages).
3GPP TSG-RAN WG2 Meeting #101—Athens, Greece, Feb. 26-Mar. 2, 2018—R2-1802667—Huawei, HiSilicon—Clarification on the MAC CE for new SCell state transition (2 pages).
First Office Action dated Feb. 24, 2021 of Australian Patent Application No. 2018414653 (4 pages).
Supplementary European Search Report dated Dec. 10, 2020 of European Patent Application No. 1891104 7.1 (9 pages).
CNIPA, First Office Action for Chinese Patent Application No. 202010503776.0, dated May 24, 2021. 21 pages with English translation.
Rospatent, Non-Final Rejection for Russian Patent Application No. 2020130857, dated Mar. 4, 2021. 9 pages with English translation.
CNIPA, Second Office Action for Chinese Application No. 202010503776.0. dated Aug. 24, 2021. 15 pages with English translation.
IPA, First Examiner's Report for Canadian Application No. 3,092,111. dated Sep. 22, 2021. 5 pages.
IPI, Examination Report for Indian Application No. 202017024927. dated Jul. 6, 2021. 6 pages with English translation.
JPO, Notice of Reasons for Refusal for Japanese Application No. 2020-547203. dated Oct. 5, 2021. 10 pages with English translation.
ZTE "Discussion on activation and deactivation MAC CE" R2-106330; 3GPP TSG-RAN WG2 Meeting #72; Nov. 15-19, 2010. 5 pages.

\* cited by examiner

300  When a first secondary carrier of a terminal device enters a dormant state, the terminal device starts or restarts a first timer ~310

If the terminal device receives, within a duration of the first timer, a Media Access Control (MAC) Control Element (CE) which indicates the first secondary carrier to enter an activated state, then the terminal device switches the first secondary carrier from the dormant state to the activated state and starts or restarts the first timer, or if the first timer expires, then the terminal device switches the first secondary carrier from the dormant state to a deactivated state ~320

FIG. 9

Start

A network device sends a Media Access Control (MAC) Control Element (CE) to a terminal device, wherein the MAC CE is used for indicating to switch a first secondary carrier of the terminal device from a first state to a second state, and the first state and the second state are two different states among an activated state, a deactivated state, and a dormant state ~410

End

FIG. 10

METHOD FOR SWITCHING STATUS OF SECONDARY CARRIER, TERMINAL DEVICE, AND NETWORK DEVICE

This application is a continuation application of International Application No. PCT/CN2018/080065 filed on Mar. 22, 2018, and the entire disclosure of the application is hereby incorporated by reference.

TECHNICAL FIELD

Implementations of the present disclosure relate to the field of communication, and more specifically, to a method for switching a state of a secondary carrier, a terminal device and a network device.

BACKGROUND

With rapid development of wireless communication technologies, Long Term Evolution (LTE) has introduced a carrier aggregation technology. In a carrier aggregation process, a User Equipment (UE) may send and receive data through multiple carriers or cells. Herein, one or more secondary carriers or secondary cells are involved. The secondary carriers are mainly responsible for providing additional radio resources for data transmission, and they may be in an activated state or a deactivated state.

Due to fluctuation and bursts of a UE's traffic, that is, a traffic volume within a certain period of time is very small, while the traffic volume in a certain period of time is very large, when the traffic volume of the UE is relatively small, in order to better save power, an activating or deactivating operation may be further performed for the secondary carriers in a carrier set. However, when the UE has a service to be processed, the secondary carrier in the deactivated state needs to be switched to the activated state. However, the time for switching from the deactivated state to the activated state may be relatively long, resulting in that the service to be processed cannot be processed in time. Therefore, a new state, namely a dormant state, is proposed in New Radio (NR), wherein the dormant state is a state between the activated state and the deactivated state. When a certain secondary carrier is in the dormant state, the UE needs to perform Radio Resource Management (RRM) measurement and Channel Quality Indicator (CQI) reporting, but the UE will not listen to a Physical Downlink Control Channel (PDCCH), which can achieve a purpose of power saving, and at the same time, can also make the UE quickly switch the secondary carrier to the activated state. After the dormant state is introduced, how to perform switching among the three states of the secondary carrier is a problem which needs to be studied.

SUMMARY

In view of the above, the present disclosure provides a method for switching a state of a secondary carrier, a terminal device and a network device, herein a network device indicates, through a MAC CE, a terminal device to switch a state of a secondary carrier.

In a first aspect, a method for switching a state of a secondary carrier is provided, including: receiving, by a terminal device, a Media Access Control (MAC) Control Element (CE) sent by a network device; and switching, by the terminal device according to the MAC CE, a first secondary carrier of the terminal device from a first state to a second state, wherein the first state and the second state are two different states among an activated state, a deactivated state, and a dormant state.

In a possible implementation, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state or the dormant state to the activated state when the value of the bit corresponding to the index of the first secondary carrier in the first MAC CE is a second value; and the second MAC CE is used for indicating to switch the first secondary carrier from the activated state or the deactivated state to the dormant state.

In a possible implementation, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state to the activated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

In a possible implementation, the MAC CE is a first MAC CE or a second MAC CE, wherein the first MAC CE is used for indicating to switch the first secondary carrier from the deactivated state or the dormant state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the deactivated state when the value of the bit corresponding to the index of the first secondary carrier in the second MAC CE is a second value.

In a possible implementation, the MAC CE is a first MAC CE or a second MAC CE, wherein the first MAC CE is used for indicating to switch the first secondary carrier from the deactivated state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

In a possible implementation, a sub-header corresponding to the first MAC CE includes a first logical channel identifier (LCD), and a sub-header corresponding to the second MAC CE includes a second LCD, wherein the first LCD is different from the second LCD.

In a possible implementation, the first state is the activated state, the second state is the dormant state, and the method further includes: when the first secondary carrier enters the dormant state from the activated state, starting or restarting, by the terminal device, a first timer; and if the terminal device receives, within a duration of the first timer, a MAC CE for indicating that the first secondary carrier enters the activated state from the dormant state, switching, by the terminal device, the first secondary carrier from the dormant state to the activated state and starting or restarting the first timer, or if the first timer expires, switching, by the terminal device, the first secondary carrier from the dormant state to the deactivated state.

In a possible implementation, starting or restarting, by the terminal device, the first timer, includes: if the first timer is a timer configured by the network device for the first secondary carrier in the activated state, restarting, by the terminal device, the first timer; or if the first timer is a timer configured by the network device for the first secondary carrier in the dormant state, starting, by the terminal device, the first timer.

In a possible implementation, the MAC CE includes multiple bits corresponding one-to-one to multiple secondary carriers of the terminal device, wherein a quantity of the multiple secondary carriers is a quantity of aggregated carriers supported by a system.

In a possible implementation, when the first secondary carrier is configured by the network device for the terminal device, the first secondary carrier is in the dormant state by default.

In a second aspect, a method for switching a state of a secondary carrier is provided, including: when a first secondary carrier of a terminal device enters a dormant state, starting or restarting, by the terminal device, a first timer; and if the terminal device receives, within a duration of the first timer, a Medium Access Control (MAC) Control Element (CE) which indicates the first secondary carrier to enter an activated state, switching, by the terminal device, the first secondary carrier from the dormant state to the activated state and starting or restarting the first timer, or if the first timer expires, switching, by the terminal device, the first secondary carrier from the dormant state to a deactivated state.

In a possible implementation, starting or restarting, by the terminal device, the first timer, includes: if the first timer is a timer configured by a network device for the first secondary carrier in the activated state, restarting, by the terminal device, the first timer; or if the first timer is a timer configured by a network device for the first secondary carrier in the dormant state, starting, by the terminal device, the first timer.

In a third aspect, a method for switching a state of a secondary carrier is provided, including: sending, by a network device, a Media Access Control (MAC) Control Element (CE) to a terminal device, wherein the MAC CE is used for indicating to switch a first secondary carrier of the terminal device from a first state to a second state, and the first state and the second state are two different states among an activated state, a deactivated state, and a dormant state.

In a fourth aspect, a terminal device is provided for executing the method in the first aspect or the method in any possible implementation of the first aspect described above. Specifically, the terminal device includes units for executing the method of the above first aspect or the method in any possible implementation of the above first aspect.

In a fifth aspect, a terminal device is provided for performing the method in the above second aspect or any possible implementation of the second aspect. Specifically, the terminal device includes units for performing the method in the above second aspect or any possible implementation of the second aspect.

In a sixth aspect, a network device is provided for executing the method in the third aspect or the method in any possible implementation of the third aspect described above. Specifically, the network device includes units used for executing the method in the third aspect or the method in any possible implementation of the third aspect described above.

In a seventh aspect, a terminal device is provided, including a memory, a processor, an input interface and an output interface. The memory, the processor, the input interface and the output interface are connected through a bus system. The memory is used for storing instructions, and the processor is used for executing the instructions stored in the memory to perform the method of the above first aspect or any possible implementation of the above first aspect.

In an eighth aspect, a terminal device is provided, including a memory, a processor, an input interface and an output interface. The memory, the processor, the input interface and the output interface are connected through a bus system. The memory is used for storing instructions, and the processor is used for executing the instructions stored in the memory to perform the method of the above second aspect or any possible implementation of the above second aspect.

In a ninth aspect, a network device is provided, including a memory, a processor, an input interface and an output interface. The memory, the processor, the input interface and the output interface are connected through a bus system. The memory is configured to store instructions, and the processor is configured to execute the instructions stored in the memory for performing the method in the above third aspect or any possible implementation of the third aspect.

In a tenth aspect, a computer storage medium is provided for storing computer software instructions for executing the method of the above first aspect or any possible implementation of the first aspect, or the method of the above second aspect or any possible implementation of the second aspect, or the method of the above third aspect or any possible implementation of the third aspect, wherein the computer software instructions include programs designed for executing the above aspect.

In an eleventh aspect, a computer program product including instructions is provided, wherein when the computer program product runs on a computer, the computer is caused to perform the method of the above first aspect or any optional implementation of the first aspect, or the method of the above second aspect or any optional implementation of the second aspect, or the method of the above third aspect or any optional implementation of the third aspect.

These aspects and other aspects of the present disclosure will be more easily understood from following descriptions of the implementations.

BRIEF DESCRIPTION OF DRAWINGS

FIG. 9 shows yet another schematic block diagram of a method for switching a state of a secondary carrier according to an implementation of the present disclosure.

FIG. 10 shows yet another schematic block diagram of a method for switching a state of a secondary carrier according to an implementation of the present disclosure.

DETAILED DESCRIPTION

Figure 1:
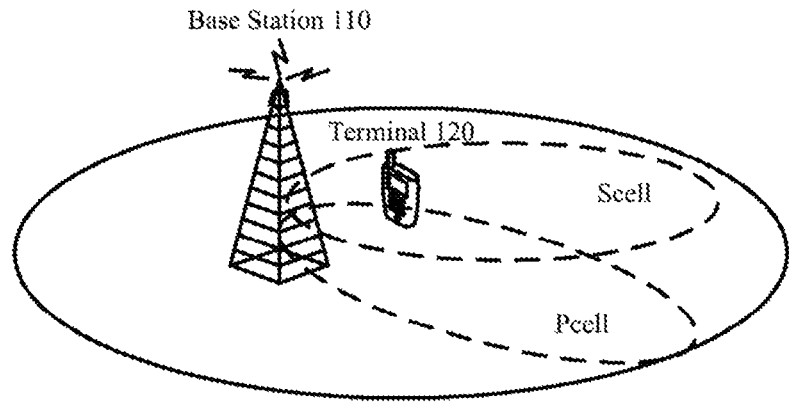
FIG. 1 shows a schematic diagram of an application scenario according to an implementation of the present disclosure.

Technical solutions in implementations of the present disclosure will be clearly and completely described below with reference to the drawings in the implementations of the present disclosure.

It should be understood that the technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolved (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, New Radio (NR), or a future 5G system, etc.

In particular, the technical solutions of the implementations of the present invention may be applied to various communication systems based on a non-orthogonal multiple access technology, such as a Sparse Code Multiple Access (SCMA) system, or a Low Density Signature (LDS) system, etc. Of course, the SCMA system and the LDS system may also be referred to as other names in the field of communication. Further, the technical solutions of the implementations of the present invention may be applied to a multi-carrier transmission system employing a non-orthogonal multiple access technology, such as an Orthogonal Frequency Division Multiplexing (OFDM) system employing a non-orthogonal multiple access technology, a Filter Bank Multi-Carrier (FBMC) system, a Generalized Frequency Division Multiplexing (GFDM) system, or a Filtered-OFDM (F-OFDM) system, etc.

A terminal device in the implementations of the present disclosure may be referred to a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a Future Evolved Public Land Mobile Network (PLMN), etc., and implementations of the present disclosure are not limited thereto.

A network device in implementations of the present disclosure may be a device for communicating with a terminal device, wherein the network device may be a Base Transceiver Station (BTS) in a GSM system or a CDMA, or may be a NodeB (NB) in a WCDMA system, or may be an Evolutional NodeB (eNB or eNodeB) in an LTE system, or may be a wireless controller in a scenario of a Cloud Radio Access Network (CRAN), or the network device may be a relay station, an access point, an on-board device, a wearable device, a network device in a future 5G network, or a network device in a future evolved PLMN network, etc., and implementations of the present disclosure are not limited thereto.

FIG. 1 is a schematic diagram of a communication system according to an implementation of the present disclosure. The communication system includes a base station 110. A terminal 120 accesses a wireless network through the base station 110, and accesses an external network (e.g., the Internet) or communicates with another terminal through the wireless network. FIG. 1 shows a scenario in which the base station 110 and the terminal 120 communicate under a CA scenario. The base station 110 configures at least two serving cells for the terminal. Here, two serving cells, namely a Primary cell (Pcell) and a Secondary cell (Scell) respectively, are taken as an example. Herein, a carrier of the Pcell is a primary carrier, and a carrier of the Scell is a secondary carrier. Here the Pcell and the Scell being cells under a same base station are taken as an example, or the Pcell and the Scell may be cells under different base stations. In addition, a quantity of the Scells may be multiple.

In an LTE system, a secondary carrier has only two states, an activated state and a deactivated state. In the activated state, the UE needs to listen to a PDCCH, report a CQI and perform RRM measurement. In the inactive state, the UE does not need to listen to a PDCCH or report a CQI, but only needs to perform RRM. When a network configures a secondary carrier for a terminal, the secondary carrier is usually in a deactivated state by default.

In the NR, a new state, i.e., a dormant state, is introduced, a purpose of which is to enable a UE to quickly switch from the dormant state to the activated state. In the dormant state, the UE does not listen to a PDCCH, but the UE feeds back a periodic CQI through the primary carrier and the UE does RRM measurement.

Figure 2:
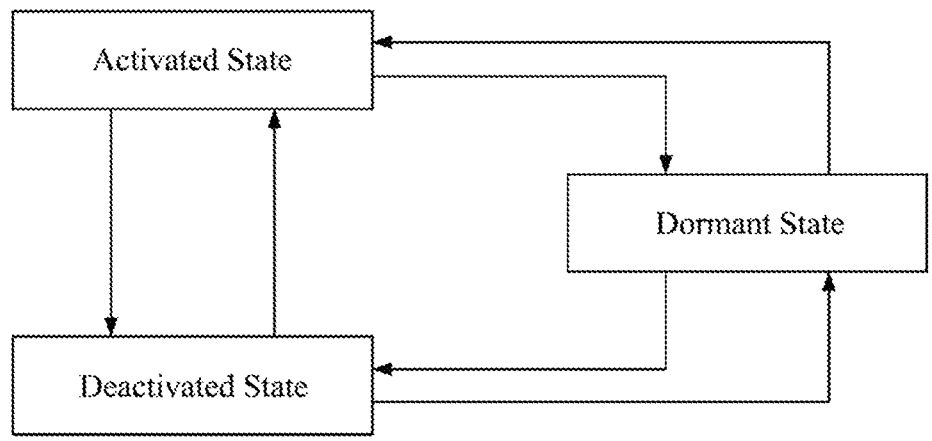
FIG. 2 shows a schematic diagram of switching directions of states of a secondary carrier according to an implementation of the present disclosure.

After this new dormant state is introduced, the UE needs to perform switching among the activated state, the deactivated state, and the dormant state, for example, as shown in FIG. 2, switching from the activated state to the deactivated state, from the deactivated state to the activated state, from the activated state to the dormant state, from the dormant state to the activated state, from the deactivated state to the dormant state, or from the dormant state to the deactivated state.

Figure 3:
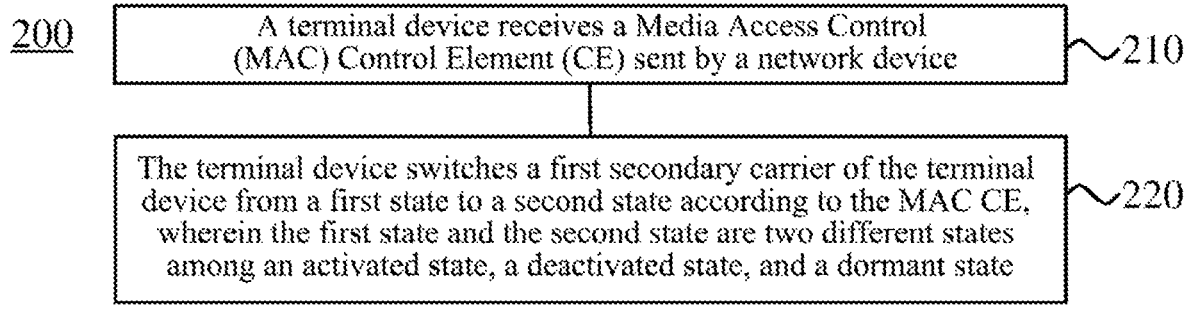
FIG. 3 shows a schematic block diagram of a method for switching a state of a secondary carrier according to an implementation of the present disclosure.

FIG. 3 is a schematic block diagram of a method 200 for switching a state of a secondary carrier provided by an implementation of the present disclosure. As shown in FIG. 3, the method 200 includes part or all of following contents: S210, a terminal device receives a Media Access Control (MAC) Control Element (CE) sent by a network device; and S220, the terminal device switches a first secondary carrier of the terminal device from a first state to a second state according to the MAC CE, wherein the first state and the second state are two different states among an activated state, a deactivated state, and a dormant state.

Figure 4:
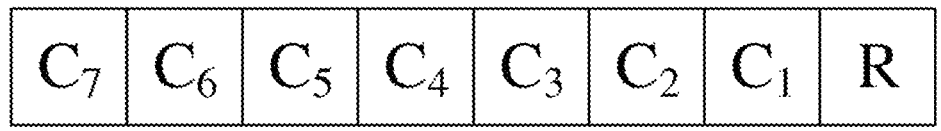
FIG. 4 shows a schematic diagram of a MAC CE format according to an implementation of the present disclosure.

Specifically, the terminal device may switch a state of a secondary carrier based on a Media Access Control Control Element (MAC CE) sent by the network device. A length of the MAC CE is related to a quantity of carriers in carrier aggregation supported by a system. Generally, the length of the MAC CE may be 8 bits or 32 bits. Taking the 8-bit MAC CE in the LTE as an example, as shown in FIG. 4, the MAC CE includes 7 C domains ($C_1$~$C_7$) and 1 R domain. During a configuration process of the secondary carrier, the system will allocate corresponding index values to different secondary carriers, and the C domain in the MAC CE may be used for representing a state of a corresponding secondary carrier. For example, when a value of $C_1$ is set to 1, it represents that the secondary carrier with the index value of 1 is activated; when a value of $C_2$ is set to 1, it represents that the secondary carrier with the index value of 2 is activated; when the value of $C_1$ is set to 0, it represents that the secondary carrier with the index value of 0 is deactivated. The R domain in the MAC CE is used as a reserved bit, a value of which is usually set to 0. In an implementation of the present disclosure, the network device may indicate, through the MAC CE and in combination with a current state of the secondary carrier, a state to which the secondary carrier needs to switch. For example, the first secondary carrier is currently in the activated state. If a bit corresponding to an index of the first secondary carrier in the MAC CE is 0, then the state of the first secondary carrier is switched to the deactivated state. If the bit corresponding to the index of the first secondary carrier in the MAC CE is 1, then the state of the first secondary carrier is switched to the dormant state. For another example, the first secondary carrier is currently in the deactivated state. If a bit corresponding to an index of the first secondary carrier in the MAC CE is 0, then the state of the first secondary carrier is switched to the dormant state. If the bit corresponding to the index of the first secondary carrier in the MAC CE is 1, then the state of the first secondary carrier is switched to the activated state. For another example, the first secondary carrier is currently in the dormant state. If a bit corresponding to an index of the first secondary carrier in the MAC CE is 0, then the state of the first secondary carrier is switched to the deactivated state. If the bit corresponding to the index of the first secondary carrier in the MAC CE is 1, then the state of the first secondary carrier is switched to the activated state.

Therefore, in the method for switching a state of a secondary carrier according to the implementation of the present disclosure, the network device indicates, through a MAC CE, the terminal device to switch a state of a secondary carrier, which is beneficial to balancing a utilization rate of secondary carriers and power consumption of the terminal device.

Optionally, in an implementation of the present disclosure, the network device may indicate, through two types of MAC CEs, to the terminal device to perform switching among the activated state, the deactivated state and the dormant state of the secondary carrier. The two types of MAC CEs may be distinguished by different identifiers. For example, they may be distinguished by a value of the R domain in FIG. 4, wherein the value of 1 represents a first type of MAC CE, and the value of 0 represents a second type of MAC CE. For another example, they may be distinguished by a logical channel identifier (LCD) included in a sub-packet header corresponding to the MAC CE, wherein the sub-packet header corresponding to the first type of MAC CE includes a first LCD, the sub-packet header corresponding to the second type of MAC CE includes a second LCD, and the first LCD is different from the second LCD. It should be understood that the first MAC CE and the second MAC CE involved in following implementations can be considered as different types of MAC CEs.

Implementations of the present disclosure will be introduced in detail below with reference to FIGS. 5 to 8.

Figure 5:
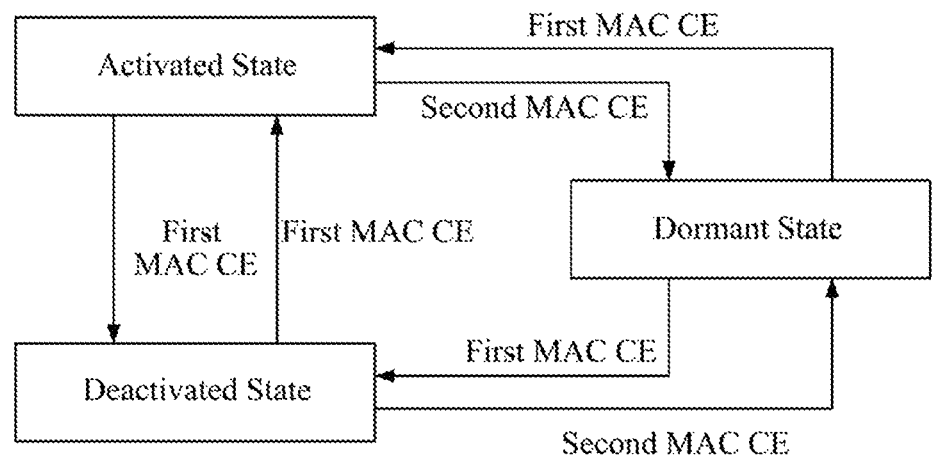
FIG. 5 shows another schematic block diagram of a method for switching a state of a secondary carrier according to an implementation of the present disclosure.

Implementation 1: as shown in FIG. 5, the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state or the dormant state to the activated state when the value of the bit corresponding to the index of the first secondary carrier in the first MAC CE is a second value; and the second MAC CE is used for indicating to switch the first secondary carrier from the activated state or the deactivated state to the dormant state.

For example, when the terminal device receives the first MAC CE, if the bit corresponding to the index of the first secondary carrier in the first MAC CE is 0, then the terminal device switches the first secondary carrier to the deactivated state, that is, if the first secondary carrier is currently in the activated state or the dormant state, the first secondary carrier is switched to the deactivated state, and if the first secondary carrier is currently in the deactivated state, then the first secondary carrier still remains in the deactivated state; if the bit corresponding to the index of the first secondary carrier in the first MAC CE is 1, then the terminal device switches the first secondary carrier to the activated state, that is, if the first secondary carrier is currently in the deactivated state or the dormant state, the first secondary carrier is switched to the activated state, and if the first secondary carrier is currently in the activated state, then the first secondary carrier still remains in the deactivated state. When the terminal device receives the second MAC CE, no matter whether the bit corresponding to the index of the first secondary carrier in the second MAC CE is 0 or 1, the terminal device switches the first secondary carrier to the dormant state. That is to say, when the first secondary carrier is currently in the activated state or the deactivated state, the first secondary carrier is switched to the dormant state, and when the first secondary carrier is currently in the dormant state, the first secondary carrier still remains in the dormant state.

Figure 6:
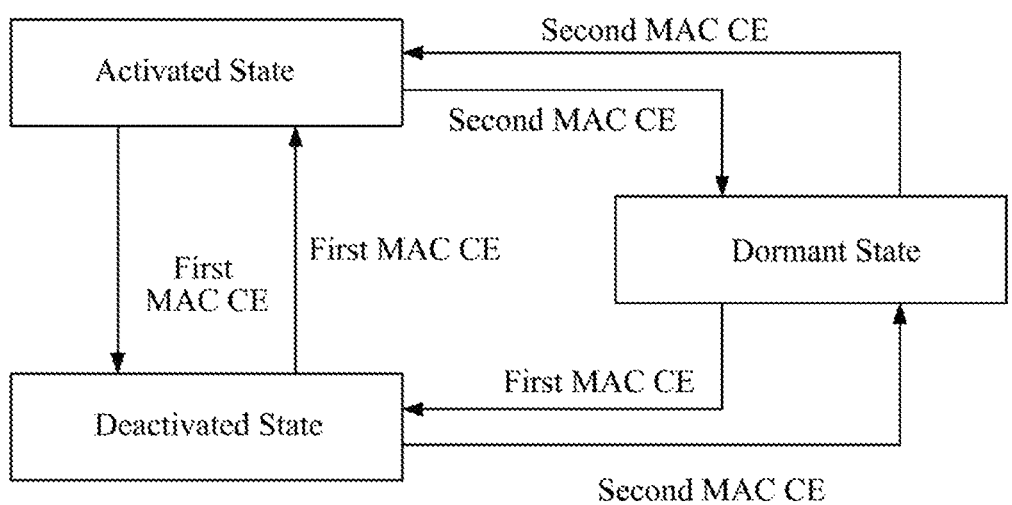
FIG. 6 shows yet another schematic block diagram of a method for switching a state of a secondary carrier according to an implementation of the present disclosure.

Implementation 2: as shown in FIG. 6, the MAC CE is the first MAC CE or the second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state to the activated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

For example, when the terminal device receives the first MAC CE, if the bit corresponding to the index of the first secondary carrier in the first MAC CE is 0, then the terminal device switches the first secondary carrier from the activated state or the dormant state to the deactivated state, that is, if the first secondary carrier is currently in the activated state or the dormant state, the first secondary carrier is switched to the deactivated state, and if the first secondary carrier is currently in the deactivated state, then the first secondary carrier still remains in the current state; and if the bit corresponding to the index of the first secondary carrier in the first MAC CE is 1, then the terminal device switches the first secondary carrier from the deactivated state to the activated state, that is, if the first secondary carrier is currently in the deactivated state, the first secondary carrier is switched to the activated state, and if the first secondary carrier is currently in the activated state or the dormant state, then the first secondary carrier still remains in the current state. When the terminal device receives the second MAC CE, if the bit corresponding to the index of the first secondary carrier in the second MAC CE is 0, then the terminal device switches the first secondary carrier to the dormant state, that is, when the first secondary carrier is currently in the activated state or the deactivated state, the first secondary carrier is switched to the dormant state, and when the first secondary carrier is currently in the dormant state, then the first secondary carrier still remains in the dormant state; and if the bit corresponding to the index of the first secondary carrier in the second MAC CE is 1, then the terminal device switches the first secondary carrier from the dormant state to the activated state, that is, if the first secondary carrier is currently in the dormant state, the first secondary carrier is switched to the activated state, and if the first secondary carrier is currently in the activated state or the deactivated state, then the first secondary carrier still remains in the current state.

Figure 7:
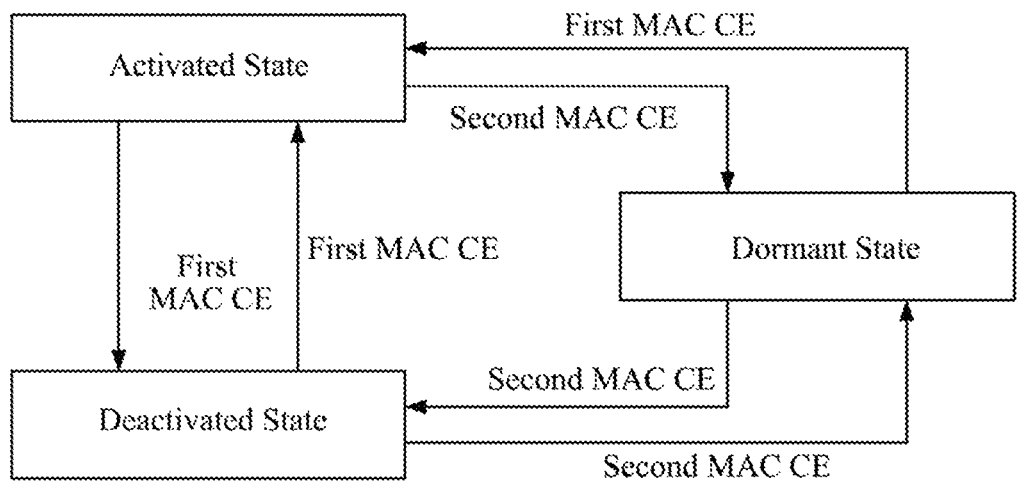
FIG. 7 shows yet another schematic block diagram of a method for switching a state of a secondary carrier according to an implementation of the present disclosure.

Implementation 3: as shown in FIG. 7, the first MAC CE is used for indicating to switch the first secondary carrier from the deactivated state or the dormant state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the deactivated state when the value of the bit corresponding to the index of the first secondary carrier in the second MAC CE is a second value.

For example, when the terminal device receives the first MAC CE, if the bit corresponding to the index of the first secondary carrier in the first MAC CE is 0, then the terminal device switches the first secondary carrier from the activated state to the deactivated state, that is, if the first secondary carrier is currently in the activated state, the first secondary carrier is switched to the deactivated state, and if the first secondary carrier is currently in the deactivated state or the dormant state, then the first secondary carrier still remains in the current state; and if the bit corresponding to the index of the first secondary carrier in the first MAC CE is 1, then the terminal device switches the first secondary carrier to the activated state, that is, if the first secondary carrier is currently in the deactivated state or the dormant state, the first secondary carrier is switched to the activated state, and if the first secondary carrier is currently in the activated state, then the first secondary carrier still remains in the activated state. When the terminal device receives the second MAC CE, if the bit corresponding to the index of the first secondary carrier in the second MAC CE is 0, then the terminal device switches the first secondary carrier to the dormant state, that is, when the first secondary carrier is currently in the activated state or the deactivated state, the first secondary carrier is switched to the dormant state, and when the first secondary carrier is currently in the dormant state, then the first secondary carrier still remains in the dormant state; and if the bit corresponding to the index of the first secondary carrier in the second MAC CE is 1, then the terminal device switches the first secondary carrier from the dormant state to the deactivated state, that is, if the first secondary carrier is currently in the dormant state, the first secondary carrier is switched to the deactivated state, and if the first secondary carrier is currently in the activated state or the deactivated state, then the first secondary carrier still remains in the current state.

Figure 8:
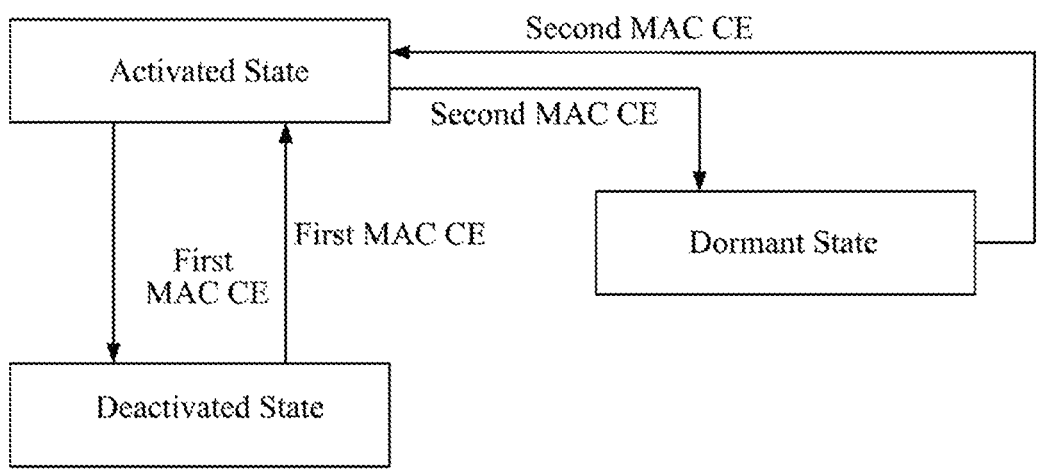
FIG. 8 shows yet another schematic block diagram of a method for switching a state of a secondary carrier according to an implementation of the present disclosure.

Implementation 4: as shown in FIG. 8, the first MAC CE is used for indicating to switch the first secondary carrier from the deactivated state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

For example, when the terminal device receives the first MAC CE, if the bit corresponding to the index of the first secondary carrier in the first MAC CE is 0, then the terminal device switches the first secondary carrier from the activated state to the deactivated state, that is, if the first secondary carrier is currently in the activated state, the first secondary carrier is switched to the deactivated state, and if the first secondary carrier is currently in the deactivated state or the dormant state, then the first secondary carrier still remains in the current state; and if the bit corresponding to the index of the first secondary carrier in the first MAC CE is 1, then the terminal device switches the first secondary carrier from the deactivated state to the activated state, that is, if the first secondary carrier is currently in the deactivated state, the first secondary carrier is switched to the activated state, and if the first secondary carrier is currently in the activated state or the dormant state, then the first secondary carrier still remains in the current state. When the terminal device receives the second MAC CE, if the bit corresponding to the index of the first secondary carrier in the second MAC CE is 0, then the terminal device switches the first secondary carrier from the activated state to the dormant state, that is, when the first secondary carrier is currently in the activated state, the first secondary carrier is switched to the dormant state, and when the first secondary carrier is currently in the dormant state or the deactivated state, then the first secondary carrier still remains in the current state; and if the bit corresponding to the index of the first secondary carrier in the second MAC CE is 1, then the terminal device switches the first secondary carrier from the dormant state to the activated state, that is, if the first secondary carrier is currently in the dormant state, the first secondary carrier is switched to the activated state, and if the first secondary carrier is currently in the activated state or the deactivated state, then the first secondary carrier still remains in the current state.

Optionally, in an implementation of the present disclosure, switching the first secondary carrier from the deactivated state to the dormant state may not need to be configured, that is, the network device does not need to indicate, through a MAC CE, the terminal device to switch the first secondary carrier in the deactivated state to the dormant state. If there are data to be transmitted, the terminal device may directly switch the first secondary carrier from the deactivated state to the activated state, with no need of transition via the dormant state to the activated state.

Optionally, in an implementation of the present disclosure, switching the first secondary carrier from the dormant state to the deactivated state may not be indicated by a MAC CE, but be implemented in combination with a timer.

For example, in FIGS. 5 to 8, the first MAC CE and the second MAC CE may be used to indicate to switch the first secondary carrier from the activated state to the deactivated state, or from the activated state to the dormant state, or from the deactivated state to the activated state, or from the dormant state to the activated state, but switching from the dormant state to the deactivated state may be implemented by the terminal device itself through a timer. Specifically, when the terminal device switches the first secondary carrier to the dormant state, the terminal device may start the timer. If the terminal device does not receive, within a timer duration, a MAC CE for switching the first secondary carrier to the activated state, the terminal device directly switches the first secondary carrier to the deactivated state when the timer expires. However, if the terminal device receives, within the timer duration, the MAC CE for switching the first secondary carrier to the activated state, the terminal device switches the first secondary carrier to the activated state.

Those skilled in the art understand that switching the first secondary carrier from the activated state to the deactivated state may also be implemented in combination with a timer, that is, when the first secondary carrier is switched to the activated state, the terminal device may start the timer, and if there are no data to be transmitted within a timer duration and no MAC CE for switching the first secondary carrier to the dormant state or making the first secondary carrier remain in the activated state is received within the timer duration, the terminal device may switch the first secondary carrier to the deactivated state; and if there are data to be transmitted within the timer duration or a MAC CE for switching the first secondary carrier to the dormant state or making the first secondary carrier remain in the activated state is received within the timer duration, the terminal device may restart the timer.

Optionally, in an implementation of the present disclosure, if the above timer is a timer configured by the network device for the first secondary carrier in the activated state, that is, the terminal device may continue, in the dormant state, to use the timer configured for the activated state, then the terminal device may restart the timer while switching the first secondary carrier to the dormant state; or if the above timer is a timer configured by the network device for the first secondary carrier in the dormant state, that is, the network device separately configures a new timer for the first secondary carrier in the dormant state, then the terminal device may start the timer while switching the first secondary carrier to the dormant state.

It should be noted that the above description is taking bits in a MAC CE being 0 and 1 respectively as an example, but the implementation of the present disclosure is not limited to this. It should be understood that the first value in the first MAC CE in the implementation of the present disclosure may be different from the first value in the second MAC CE, that is, the first value in the first MAC CE may be 0 and the first value in the second MAC CE may be 1.

Optionally, in an implementation of the present disclosure, when the network device configures the first secondary carrier for the terminal device, the first secondary carrier is in the dormant state by default. An initial state of the first secondary carrier is configured as the dormant state, so that when the terminal device does not have data to be transmitted for a long time, the terminal device may automatically switch the first secondary carrier to the deactivated state, and when the terminal device has data to be transmitted, the terminal device may quickly switch the first secondary carrier to the activated state.

FIG. 9 shows a schematic block diagram of a method 300 for switching a state of a secondary carrier according to an implementation of the present disclosure. As shown in FIG. 9, the method 300 includes part or all of following contents: S310, when a first secondary carrier of a terminal device enters a dormant state, the terminal device starts or restarts a first timer; and S320, if the terminal device receives, within a duration of the first timer, a Media Access Control (MAC) Control Element (CE) which indicates the first secondary carrier to enter an activated state, then the terminal device switches the first secondary carrier from the dormant state to the activated state and starts or restarts the first timer, or if the first timer expires, then the terminal device switches the first secondary carrier from the dormant state to a deactivated state.

Therefore, in the method for switching a state of a secondary carrier according to the implementation of the present disclosure, switching the secondary carrier from the dormant state to the deactivated state is implemented through the timer, which can reduce overhead of MAC CEs.

Optionally, in an implementation of the present disclosure, the terminal device starts or restarts the first timer, includes: if the first timer is a timer configured by a network device for the first secondary carrier in the activated state, then the terminal device restarts the first timer; or if the first timer is a timer configured by a network device for the first secondary carrier in the dormant state, then the terminal device starts the first timer.

It should be understood that the relevant contents of the method 300 provided by the implementation of the present disclosure have been described in detail in the above method 200, and will not be repeated here for the sake of brevity.

FIG. 10 shows a schematic block diagram of a method 400 for switching a state of a secondary carrier according to an implementation of the present disclosure. As shown in FIG. 10, the method 400 includes part or all of following contents: S410, a network device sends a Media Access Control (MAC) Control Element (CE) to a terminal device, wherein the MAC CE is used for indicating to switch a first secondary carrier of the terminal device from a first state to a second state, and the first state and the second state are two different states among an activated state, a deactivated state, and a dormant state.

Therefore, in the method for switching a state of a secondary carrier according to the implementation of the present disclosure, the network device indicates, through a MAC CE, the terminal device to switch a state of a secondary carrier, which is beneficial to balancing a utilization rate of secondary carriers and power consumption of the terminal device.

Optionally, in an implementation of the present disclosure, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state or the dormant state to the activated state when the value of the bit corresponding to the index of the first secondary carrier in the first MAC CE is a second value; and the second MAC CE is used for indicating to switch the first secondary carrier from the activated state or the deactivated state to the dormant state.

Optionally, in an implementation of the present disclosure, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state to the activated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, the MAC CE is a first MAC CE or a second MAC CE, wherein the first MAC CE is used for indicating to switch the first secondary carrier from the deactivated state or the dormant state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the deactivated state when the value of the bit corresponding to the index of the first secondary carrier in the second MAC CE is a second value.

Optionally, in an implementation of the present disclosure, the MAC CE is a first MAC CE or a second MAC CE, wherein the first MAC CE is used for indicating to switch the first secondary carrier from the deactivated state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, a sub-header corresponding to the first MAC CE includes a first logical channel identifier (LCD), and a sub-header corresponding to the second MAC CE includes a second LCD, wherein the first LCD is different from the second LCD.

Optionally, in an implementation of the present disclosure, the MAC CE includes multiple bits corresponding one-to-one to multiple secondary carriers of the terminal device, wherein a quantity of the multiple secondary carriers is a quantity of aggregated carriers supported by a system.

Optionally, in an implementation of the present disclosure, when the network device configures the first secondary carrier for the terminal device, the first secondary carrier is in the dormant state by default.

It should be understood that interaction between the network device and the terminal device, and related characteristics and functions of the network device, etc., described by the network side correspond to related characteristics and functions of the terminal device. And the related contents have been described in detail in the above method 200, and will not be repeated here for the sake of brevity.

It should be understood that in various implementations of the present invention, values of sequence numbers in the aforementioned processes do not indicate an order of execution, and the order of execution of various processes should be determined by their functions and internal logics, and should not constitute any limitation on implementation processes of implementations of the present disclosure.

The method for switching a state of a secondary carrier according to the implementation of the present disclosure has been described in detail above. The apparatus for switching a state of a secondary carrier according to an implementation of the present disclosure will be described below with reference to FIGS. 11 to 16. The technical features described in the method implementation are applicable to the following device implementation.

Figure 11:
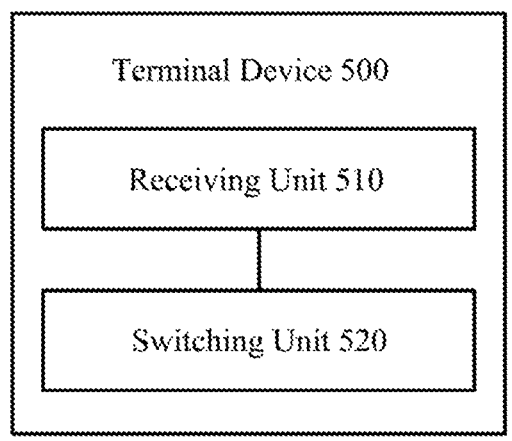
FIG. 11 shows a block diagram of a terminal device according to an implementation of the present disclosure.

FIG. 11 shows a block diagram of a terminal device 500 according to an implementation of the present disclosure. As shown in FIG. 11, the terminal device 500 includes: a receiving unit 510, configured to receive a Media Access Control (MAC) Control Element (CE) sent by a network device; and a switching unit 520, which switches, according to the MAC CE, a first secondary carrier of the terminal device from a first state to a second state, wherein the first state and the second state are two different states among an activated state, a deactivated state, and a dormant state.

Therefore, for the terminal device of the implementation of the present disclosure, the network device indicates, through a MAC CE, the terminal device to switch a state of a secondary carrier, which is beneficial to balancing a utilization rate of secondary carriers and power consumption of the terminal device.

Optionally, in an implementation of the present disclosure, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state or the dormant state to the activated state when the value of the bit corresponding to the index of the first secondary carrier in the first MAC CE is a second value; and the second MAC CE is used for indicating to switch the first secondary carrier from the activated state or the deactivated state to the dormant state.

Optionally, in an implementation of the present disclosure, the MAC CE is a first MAC CE or a second MAC CE, wherein the first MAC CE is used for indicating to switch the first secondary carrier from the activated state or the dormant state to the deactivated state when a value of a bit corresponding to the index of the first secondary carrier in the first MAC CE is a first value, and to switch the first secondary carrier from the deactivated state to the activated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, the MAC CE is a first MAC CE or a second MAC CE, wherein the first MAC CE is used for indicating to switch the first secondary carrier from the deactivated state or the dormant state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the deactivated state when the value of the bit corresponding to the index of the first secondary carrier in the second MAC CE is a second value.

Optionally, in an implementation of the present disclosure, the MAC CE is a first MAC CE or a second MAC CE, wherein the first MAC CE is used for indicating to switch the first secondary carrier from the deactivated state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, a sub-header corresponding to the first MAC CE includes a first logical channel identifier (LCD), and a sub-header corresponding to the second MAC CE includes a second LCD, wherein the first LCD is different from the second LCD.

Optionally, in an implementation of the present disclosure, the first state is the activated state, the second state is the dormant state, and the terminal device further includes: a timing unit, configured to, when the first secondary carrier enters the dormant state from the activated state, start or restart a first timer; and the switching unit is further configured to, if the receiving unit receives, within a duration of the first timer, a MAC CE for indicating that the first secondary carrier enters the activated state from the dormant state, switch the first secondary carrier from the dormant state to the activated state, or if the first timer expires, switch the first secondary carrier from the dormant state to the deactivated state.

Optionally, in an implementation of the present disclosure, the timing unit is specifically configured to, if the first timer is a timer configured by the network device for the first secondary carrier in the activated state, restart the first timer; or if the first timer is a timer configured by the network device for the first secondary carrier in the dormant state, start the first timer.

Optionally, in an implementation of the present disclosure, the MAC CE includes multiple bits corresponding one-to-one to multiple secondary carriers of the terminal device, wherein a quantity of the multiple secondary carriers is a quantity of aggregated carriers supported by a system.

Optionally, in an implementation of the present disclosure, when the network device configures the first secondary carrier for the terminal device, the first secondary carrier is in the dormant state by default.

It should be understood that the terminal device 500 according to the implementation of the present disclosure may correspond to the terminal device in the method implementation of the present disclosure, and the above and other operations and/or functions of various units in the terminal device 500 are respectively for implementing the corresponding processes of the terminal device in the method shown in FIG. 3, and this will not be repeated here for the sake of brevity.

Figure 12:
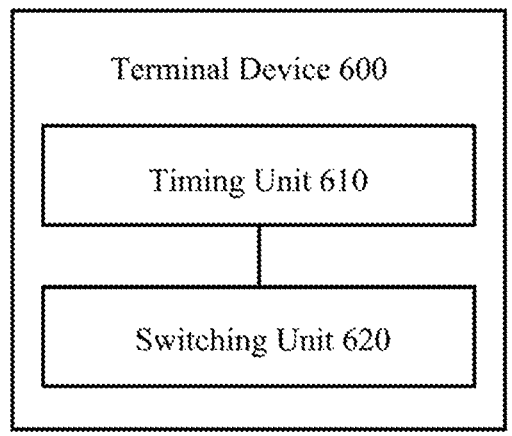
FIG. 12 shows another block diagram of a terminal device according to an implementation of the present disclosure.

FIG. 12 shows a block diagram of a terminal device 600 according to an implementation of the present disclosure. As shown in FIG. 12, the terminal device 600 includes: a timing unit 610, configured to, when a first secondary carrier of the terminal device enters the dormant state, start or restart a first timer; and a switching unit 620, configured to, if the terminal device receives, within a duration of the first timer, a Media Access Control (MAC) Control Element (CE) which indicates the first secondary carrier to enter an activated state, switch the first secondary carrier from the dormant state to the activated state, or if the first timer expires, switch the first secondary carrier from the dormant state to the deactivated state.

Therefore, in the terminal device of the implementation of the present disclosure, switching a secondary carrier from the dormant state to the deactivated state is implemented through a timer, which can reduce overhead of MAC CEs.

Optionally, in an implementation of the present disclosure, the timing unit is specifically configured to, if the first timer is a timer configured by a network device for the first secondary carrier in the activated state, restart the first timer; or if the first timer is a timer configured by a network device for the first secondary carrier in the dormant state, start the first timer.

It should be understood that the terminal device 600 according to the implementation of the present disclosure may correspond to the terminal device in the method implementation of the present disclosure, and the above and other operations and/or functions of various units in the terminal device 600 are respectively for implementing the corresponding processes of the terminal device in the method shown in FIG. 9, and this will not be repeated here for the sake of brevity.

Figure 13:
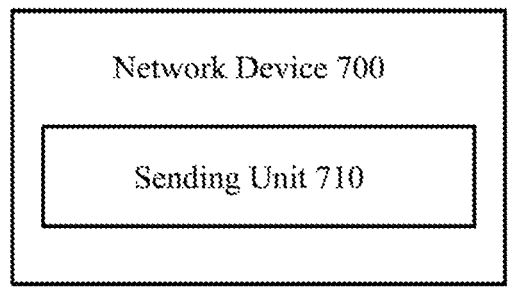
FIG. 13 shows a block diagram of a network device according to an implementation of the present disclosure.

FIG. 13 shows a block diagram of a network device 700 according to an implementation of the present disclosure. As shown in FIG. 13, the network device 700 includes: a sending unit 710, configured to send a Media Access Control (MAC) Control Element (CE) to a terminal device, wherein the MAC CE is used for indicating to switch a first secondary carrier of the terminal device from a first state to a second state, and the first state and the second state are two different states among an activated state, a deactivated state, and a dormant state.

Therefore, in the network device of the implementation of the present disclosure, the network device indicates, through a MAC CE, the terminal device to switch a state of a secondary carrier, which is beneficial to balancing an utilization rate of secondary carriers and power consumption of the terminal device.

Optionally, in an implementation of the present disclosure, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state or the dormant state to the activated state when the value of the bit corresponding to the index of the first secondary carrier in the first MAC CE is a second value; and the second MAC CE is used for indicating to switch the first secondary carrier from the activated state or the deactivated state to the dormant state.

Optionally, in an implementation of the present disclosure, the MAC CE is a first MAC CE or a second MAC CE, wherein the first MAC CE is used for indicating to switch the first secondary carrier from the activated state or the dormant state to the deactivated state when a value of a bit corresponding to an index of the first secondary carrier in the first MAC CE is a first value, and to switch the first secondary carrier from the deactivated state to the activated state when the value of the bit corresponding to the index of the first secondary carrier in the first MAC CE is a second value; and the second MAC CE is used for indicating to switch the first secondary carrier from the activated state or the deactivated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, the MAC CE is a first MAC CE or a second MAC CE, wherein the first MAC CE is used for indicating to switch the first secondary carrier from the deactivated state or the dormant state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, the MAC CE is a first MAC CE or a second MAC CE, wherein the first MAC CE is used for indicating to switch the first secondary carrier from the deactivated state to the activated state when a value of a bit corresponding to an index of the first secondary carrier in the first MAC CE is a first value, and to switch the first secondary carrier from the activated state to the deactivated state when the value of the bit corresponding to the index of the first secondary carrier in the first MAC CE is a second value; and the second MAC CE is used for indicating to switch the first secondary carrier from the activated state to the dormant state when a value of a bit corresponding to an index of the first secondary carrier in the second MAC CE is a first value, and to switch the first secondary carrier from the dormant state to the activated state when the value of the bit corresponding to the index of the first secondary carrier in the second MAC CE is a second value.

Optionally, in an implementation of the present disclosure, a sub-header corresponding to the first MAC CE includes a first logical channel identifier (LCD), and a sub-header corresponding to the second MAC CE includes a second LCD, wherein the first LCD is different from the second LCD.

Optionally, in an implementation of the present disclosure, the MAC CE includes multiple bits corresponding one-to-one to multiple secondary carriers of the terminal device, wherein a quantity of the multiple secondary carriers is a quantity of aggregated carriers supported by a system.

Optionally, in an implementation of the present disclosure, when the network device configures the first secondary carrier for the terminal device, the first secondary carrier is in the dormant state by default.

It should be understood that the network device 700 according to the implementation of the present disclosure may correspond to the network device in the method implementation of the present disclosure, and the above and other operations and/or functions of various units in the network device 700 are respectively for implementing the corresponding processes of the network device in the method shown in FIG. 10, and this will not be repeated here for the sake of brevity.

Figure 14:
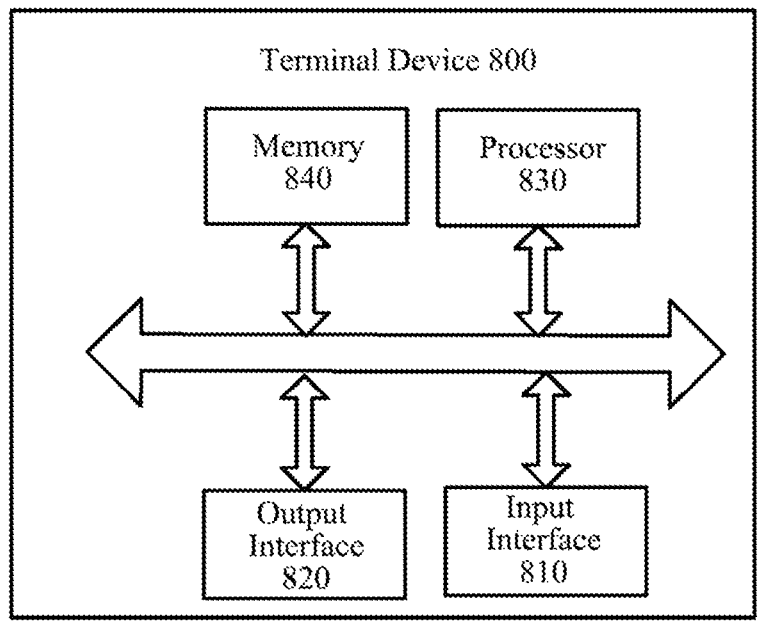
FIG. 14 shows yet another block diagram of a terminal device according to an implementation of the present disclosure.

As shown in FIG. 14, an implementation of the present disclosure further provides a terminal device 800. The terminal device 800 may be the terminal device 500 in FIG. 11, which may be used for performing contents corresponding to the terminal device in the method 200 in FIG. 3. The terminal device 800 includes an input interface 810, an output interface 820, a processor 830, and a memory 840. The input interface 810, the output interface 820, the processor 830, and the memory 840 may be connected through a bus system. The memory 840 is configured to store programs, instructions, or codes. The processor 830 is configured to execute the programs, the instructions, or the codes in the memory 840 to control the input interface 810 to receive signals, to control the output interface 820 to send signals, and to complete the operations in the foregoing method implementation.

It should be understood that in an implementation of the present disclosure, the processor 830 may be a Central Processing Unit (CPU), or the processor 830 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 840 may include a read-only memory and a random access memory, and provide instructions and data to the processor 830. A portion of memory 840 may include non-volatile random access memory. For example, the memory 840 may also store information of device type.

In implementation processes, various contents of the methods described above may be accomplished by integrated logic circuits of hardware or instructions in the form of software in the processor 830. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 840, and the processor 830 reads the information in the memory 840, and accomplishes the contents of the above method in combination with its hardware. In order to avoid repetition, it will not be described in detail here.

In a specific implementation, the receiving unit in the terminal device 500 may be implemented by the input interface 810 in FIG. 14, and the switching unit in the terminal device 500 may be implemented by the processor 830 in FIG. 14.

Figure 15:
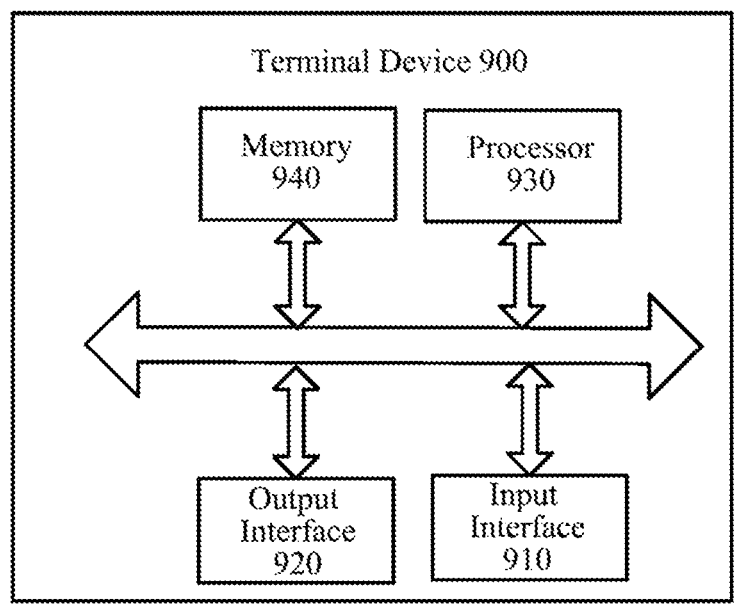
FIG. 15 shows yet another block diagram of a terminal device according to an implementation of the present disclosure.

As shown in FIG. 15, an implementation of the present disclosure further provides a terminal device 900. The terminal device 900 may be the terminal device 600 in FIG. 12, which may be used for performing contents corresponding to the terminal device in the method 300 in FIG. 9. The terminal device 900 includes an input interface 910, an output interface 920, a processor 930, and a memory 940. The input interface 910, the output interface 920, the processor 930, and the memory 940 may be connected through a bus system. The memory 940 is configured to store programs, instructions, or codes. The processor 930 is configured to execute the programs, the instructions, or the codes in the memory 940 to control the input interface 910 to receive signals, to control the output interface 920 to send signals, and to complete the operations in the foregoing method implementation.

It should be understood that in an implementation of the present disclosure, the processor 930 may be a Central Processing Unit (CPU), or the processor 930 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 940 may include a read-only memory and a random access memory, and provide instructions and data to the processor 930. A portion of memory 940 may include non-volatile random access memory. For example, the memory 940 may also store information of device type.

In implementation processes, various contents of the methods described above may be accomplished by integrated logic circuits of hardware or instructions in the form of software in the processor 930. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 940, and the processor 930 reads the information in the memory 940, and accomplishes the contents of the above method in combination with its hardware. In order to avoid repetition, it will not be described in detail here.

In a specific implementation, the timing unit and the switching unit in the terminal device 600 may be implemented by the processor 930 in FIG. 15.

Figure 16:
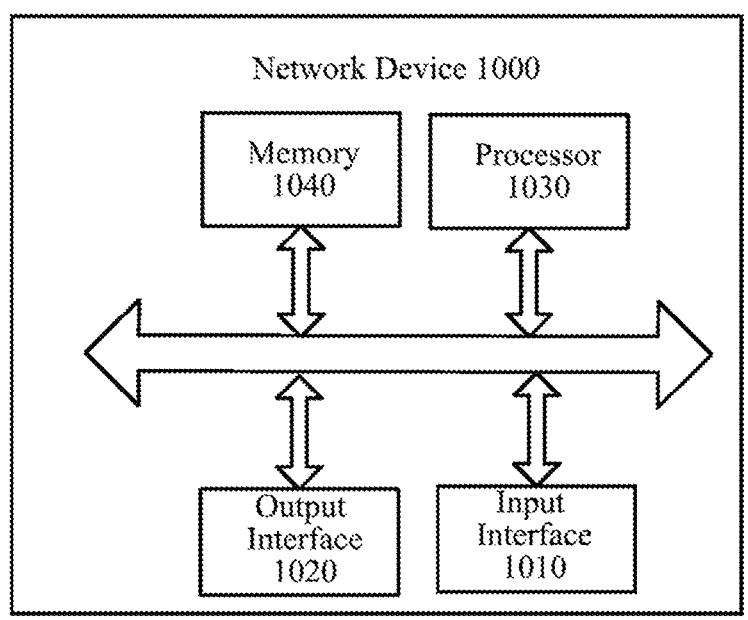
FIG. 16 shows another block diagram of a network device according to an implementation of the present disclosure.

As shown in FIG. 16, implementations of the present disclosure further provide a network device 1000. The network device 1000 may be the network device 700 in FIG. 13, which may be used for performing contents corresponding to the network device in the method 300 in FIG. 10. The network device 1000 includes an input interface 1010, an output interface 1020, a processor 1030, and a memory 1040. The input interface 1010, the output interface 1020, the processor 1030, and the memory 1040 may be connected through a bus system. The memory 1040 is configured to store programs, instructions, or codes. The processor 1030 is configured to execute the programs, the instructions, or the codes in the memory 1040 to control the input interface 1010 to receive signals, to control the output interface 1020 to send signals, and to complete the operations in the foregoing method implementation.

It should be understood that in an implementation of the present disclosure, the processor 1030 may be a Central Processing Unit (CPU), or the processor 1030 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 1040 may include a read-only memory and a random access memory, and provide instructions and data to the processor 1030. A portion of memory 1040 may include non-volatile random access memory. For example, the memory 1040 may also store information of device type.

In implementation processes, various contents of the methods described above may be accomplished by integrated logic circuits of hardware or instructions in the form of software in the processor 1030. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1040, and the processor 1030 reads the information in the memory 1040, and accomplishes the contents of the above method in combination with its hardware. In order to avoid repetition, it will not be described in detail here.

In a specific implementation, the sending unit in the network device 700 may be implemented by the output interface 1020 in FIG. 16.

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product, wherein the computer software product is stored in a storage medium, and includes a number of instructions for causing a computer device (which may be a personal computer, a server, or a network device, etc.) to perform all or part of the acts in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for switching a state of a secondary carrier, comprising:

receiving, by a terminal device, a Media Access Control (MAC) Control Element (CE) sent by a network device; and switching, by the terminal device and according to the MAC CE, a first secondary carrier of the terminal device from a first state to a second state, wherein one of the first state and the second state is a dormant state, and the other is an activated state or a deactivated state, wherein the MAC CE is a first MAC CE or a second MAC CE, and wherein each of the first and second MAC CEs is configured to control three state changes among the dormant state, the activated state, and the deactivated state;

wherein, when the MAC CE is the first MAC CE, the first MAC CE is used for indicating:

switching the first secondary carrier from the activated state or the dormant state to the deactivated state, when a value of a bit corresponding to an index of the first secondary carrier in the first MAC CE is a first value, and wherein the first MAC CE is further used for indicating:

switching the first secondary carrier from the deactivated state to the activated state, when the value of the bit corresponding to the index of the first secondary carrier in the first MAC CE is a second value, wherein, when the MAC CE is the second MAC CE, the second MAC CE indicates:

switching the first secondary carrier from the activated state or the deactivated state to the dormant state when a value of a bit corresponding to an index of the first secondary carrier in the second MAC CE is a first value; and switching the first secondary carrier from the dormant state to the activated state when the value of the bit corresponding to the index of the first secondary carrier in the second MAC CE is a second value; and wherein a sub-header corresponding to the first MAC CE comprises a first logical channel identifier (LCID), and a sub-header corresponding to the second MAC CE comprises a second LCID, wherein the first LCID is different from the second LCID.

2. The method according to claim 1, wherein the second MAC CE comprises:

a R domain bit and C domain bits, wherein the R domain bit is a reserved bit, value of which is 0, and wherein each of the C domain bits corresponds to an index of a secondary carrier.

3. The method according to claim 2, wherein a length of the second MAC CE is 8 bits or 32 bits.

4. The method according to claim 1, wherein a first value in the second MAC CE is 1.

5. The method according to claim 1, wherein a first value in the first MAC CE is 0.

6. The method according to claim 1, wherein the first state is the activated state, the second state is the dormant state, and the method further comprises:
   starting or restarting, by the terminal device, a first timer when the first secondary carrier enters the dormant state from the activated state; and
   switching, by the terminal device, the first secondary carrier from the dormant state to the deactivated state when the first timer expires.

7. A method for switching a state of a secondary carrier, comprising:
   sending, by a network device, a Media Access Control (MAC) Control Element (CE) to a terminal device, wherein the MAC CE is used for indicating to switch a first secondary carrier of the terminal device from a first state to a second state, one of the first state and the second state is a dormant state, and the other is an activated state or a deactivated state, wherein the MAC CE is a first MAC CE or a second MAC CE, and wherein each of the first and second MAC CEs is configured to control three state changes among the dormant state, the activated state, and the deactivated state;
   wherein, when the MAC CE is the first MAC CE,
   the first MAC CE is used for indicating switching the first secondary carrier from the activated state or the dormant state to the deactivated state, when a value of a bit corresponding to an index of the first secondary carrier in the first MAC CE is a first value, and
   wherein the first MAC CE is further used for indicating switching the first secondary carrier from the deactivated state to the activated state, when the value of the bit corresponding to the index of the first secondary carrier in the first MAC CE is a second value,
   wherein, when the MAC CE is the second MAC CE, the second MAC CE indicates:
     switching the first secondary carrier from the activated state or the deactivated state to the dormant state when a value of a bit corresponding to an index of the first secondary carrier in the second MAC CE is a first value; and
     switching the first secondary carrier from the dormant state to the activated state when the value of the bit corresponding to the index of the first secondary carrier in the second MAC CE is a second value; and
   wherein a sub-header corresponding to the first MAC CE comprises a first logical channel identifier (LCID), and a sub-header corresponding to the second MAC CE comprises a second LCID, wherein the first LCID is different from the second LCID.

8. The method according to claim 7, wherein the second MAC CE comprises:
   a R domain bit and C domain bits, wherein the R domain bit is a reserved bit, value of which is 0, and wherein each of the C domain bits corresponds to an index of a secondary carrier.

9. The method according to claim 8, wherein a length of the second MAC CE is 8 bits or 32 bits.

10. The method according to claim 7, wherein a first value in the second MAC CE is 1.

11. The method according to claim 7, wherein a first value in the first MAC CE is 0.

12. The method according to claim 7, wherein the MAC CE comprises multiple bits corresponding one-to-one to multiple secondary carriers of the terminal device, wherein a quantity of the multiple secondary carriers is a quantity of aggregated carriers supported by a system.

13. The method according to claim 7, wherein when configuring, by the network device, the first secondary carrier for the terminal device, the first secondary carrier is in the dormant state by default.

14. A terminal device, comprising a memory, a processor, an input interface and an output interface, the memory, the processor, the input interface and the output interface are connected through a bus system, the memory is configured to store instructions, and the processor is configured to execute the instructions stored in the memory to:
   receive a Media Access Control (MAC) Control Element (CE) sent by a network device; and
   switch, according to the MAC CE, a first secondary carrier of the terminal device from a first state to a second state, wherein one of the first state and the second state is a dormant state, and the other is an activated state or a deactivated state, wherein the MAC CE is a first MAC CE or a second MAC CE, and wherein each of the first and second MAC CEs is configured to control three state changes among the dormant state, the activated state, and the deactivated state;
   wherein, when the MAC CE is the first MAC CE,
   the first MAC CE is used for indicating:
     switching the first secondary carrier from the activated state or the dormant state to the deactivated state, when a value of a bit corresponding to an index of the first secondary carrier in the first MAC CE is a first value, and
     wherein the first MAC CE is further used for indicating: switching the first secondary carrier from the deactivated state to the activated state, when the value of the bit corresponding to the index of the first secondary carrier in the first MAC CE is a second value,
   wherein, when the MAC CE is the second MAC CE, the second MAC CE indicates:
     switching the first secondary carrier from the activated state or the deactivated state to the dormant state when a value of a bit corresponding to an index of the first secondary carrier in the second MAC CE is a first value; and
     switching the first secondary carrier from the dormant state to the activated state when the value of the bit corresponding to the index of the first secondary carrier in the second MAC CE is a second value; and
   wherein a sub-header corresponding to the first MAC CE comprises a first logical channel identifier (LCID), and a sub-header corresponding to the second MAC CE comprises a second LCID, wherein the first LCID is different from the second LCID.

15. The terminal device according to claim 14, wherein the second MAC CE comprises:

a R domain bit and C domain bits, wherein the R domain bit is a reserved bit, value of which is 0, and wherein each of the C domain bits corresponds to an index of a secondary carrier.

16. A network device, comprising a memory, a processor, an input interface and an output interface, the memory, the processor, the input interface and the output interface are connected through a bus system, the memory is configured to store instructions, and the processor is configured to execute the instructions stored in the memory to:
   send a Media Access Control (MAC) Control Element (CE) to a terminal device, wherein the MAC CE is used for indicating to switch a first secondary carrier of the terminal device from a first state to a second state, one of the first state and the second state is dormant state, and the other is activated state or deactivated state, wherein the MAC CE is a first MAC CE or a second MAC CE, and wherein each of the first and second MAC CEs is configured to control three state changes among the dormant state, the activated state, and the deactivated state;
wherein, when the MAC CE is the first MAC CE,
the first MAC CE is used for indicating:
   switching the first secondary carrier from the activated state or the dormant state to the deactivated state, when a value of a bit corresponding to an index of the first secondary carrier in the first MAC CE is a first value, and
wherein the first MAC CE is further used for indicating:
   switching the first secondary carrier from the deactivated state to the activated state, when the value of the bit corresponding to the index of the first secondary carrier in the first MAC CE is a second value,
wherein, when the MAC CE is the second MAC CE, the second MAC CE indicates:
   switching the first secondary carrier from the activated state or the deactivated state to the dormant state when a value of a bit corresponding to an index of the first secondary carrier in the second MAC CE is a first value; and
   switching the first secondary carrier from the dormant state to the activated state when the value of the bit corresponding to the index of the first secondary carrier in the second MAC CE is a second value; and
wherein a sub-header corresponding to the first MAC CE comprises a first logical channel identifier (LCID), and a sub-header corresponding to the second MAC CE comprises a second LCID, wherein the first LCID is different from the second LCID.

* * * * *